Sept. 2, 1969     C. R. HURTIG     3,464,123
MATHEMATICAL TEACHING AID
Filed April 17, 1967
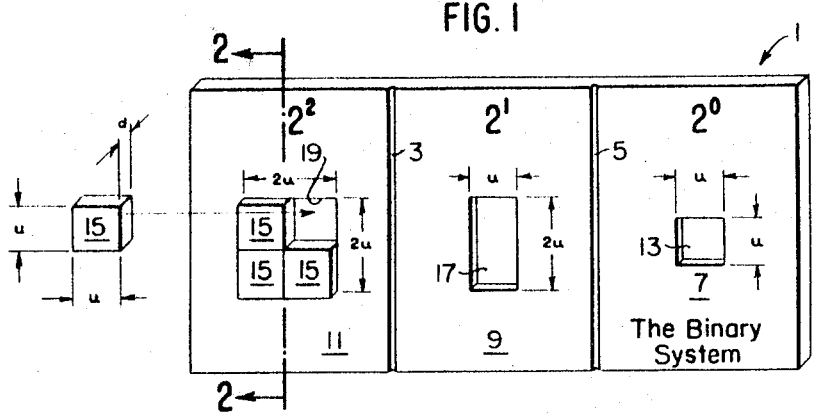
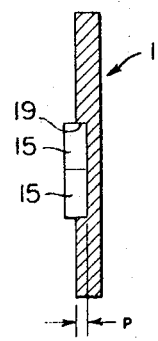
FIG. 1
FIG. 2
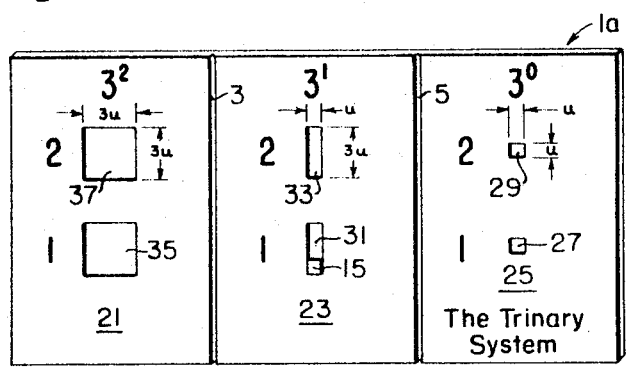
FIG. 3
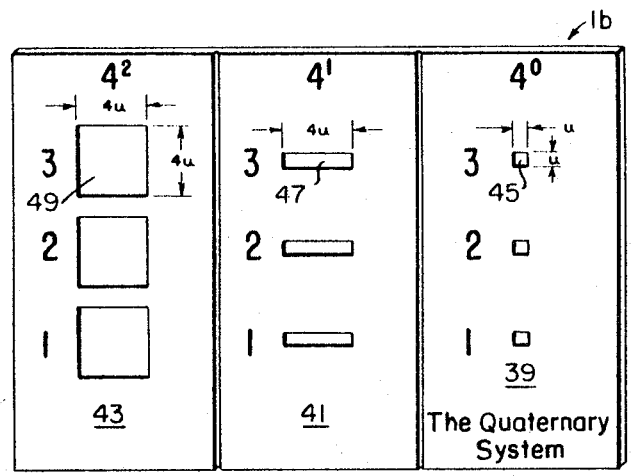
FIG. 4
*INVENTOR.*
CARL R. HURTIG
BY
Kenway, Jenney & Hildreth
ATTORNEYS

United States Patent Office 3,464,123
Patented Sept. 2, 1969

---

3,464,123
MATHEMATICAL TEACHING AID
Carl R. Hurtig, Greenbush, Mass., assignor to Damon Engineering, Inc., Needham Heights, Mass., a corporation of Delaware
Filed Apr. 17, 1967, Ser. No. 631,321
Int. Cl. G09b 23/02
U.S. Cl. 35—30        6 Claims

ABSTRACT OF THE DISCLOSURE

This application discloses an aid for teaching the expression of numbers in a number system having an integral base. For a three digit number in the trinary system, a number board, having three sequential panels labelled $3^2$, $3^1$ and $3^0$ is provided. On each panel are two receptacles, each of area $k$ on panel $3^0$, $3k$ on panel $3^1$, and $9k$ on panel $3^2$. A set of 26 unit counters of area $k$ each adapted to fit the receptacles can be used to represent any number from 000 to 222 by taking that number of counters and placing them in the receptacles in a prescribed way. The invention is applicable to any number system having an integral base. The full specification should be consulted for a complete understanding of the invention.

---

My invention relates to teaching aids, and particularly to novel apparatus useful in teaching the fundamentals of number theory.

It is becoming common to teach the more abstract aspects of number theory early in the educational process. However, the younger students cannot follow a purely analytic approach, and have little experience to which the new concepts can be related. In particular, the expression of numbers in number systems built on bases other than 10, and counting in such number systems, is quite foreign to a child's experience. Accordingly, a way of visualizing the concepts involved in explaining and generalizing the idea of a number system is highly desirable. It is an object of my invention to facilitate the teaching of numbers in any number system having an integral base.

Briefly, the above and other objects of my invention are attained by the provision of a set of number boards, each inscribed to divide the board into at least two and preferably more panels; one panel being provided for each digit of the number to be expressed.

A different board is provided for each different number base, the receptacle in the board being determined by the number base chosen. Each number base is an integer. The total number of receptacles on each board is determined by the largest number to be expressed. A set of unit counters is provided, equal in number to the largest number to be expressed and formed to engage the receptacles on the board. With the apparatus described, as will appear from the fuller description that follows, the student can readily relate the counting and expression of numbers in a number system having any desired base to his experience in the simple counting of unit objects.

The construction of the apparatus of my invention, and its mode of operation, will best be understood in the light of the following detailed description, together with the accompanying drawings, of a preferred embodiment thereof.

In the drawings:

FIG. 1 is a schematic perspective sketch of a number board in accordance with my invention, shown associated with a plurality of unit counters, and adapted to illustrate the binary number system;

FIG. 2 is a fragmentary cross-sectional view of the board of FIG. 1, taken substantially along the lines 2—2 in FIG. 1;

FIG. 3 is a schematic perspective sketch, on a smaller scale than FIG. 1, of a number board in accordance with a second embodiment of my invention, adapted to illustrate the trinary number system; and FIG. 4 is a schematic perspective sketch, essentially to the scale of FIG. 2, of a number board in accordance with a third embodiment of my invention, adapted to illustrate the quaternary number system.

Referring to FIGURES 1 and 2, I have shown apparatus for illustrating the binary number system as comprising a number board generally designated 1, of wood, plastic, heavy cardboard or the like. The board is provided with vertical grooves 3 and 5, or other suitable means to clearly mark it off into three panels 7, 9 and 11.

Preferably, the panels 7, 9 and 11 are of the same shape and have equal areas. The advantage of this relationship is that it makes a good analogy with the number system illustrated, with the same space being alloted to the representation of each digit and the weight of each digit being determined by its position in the digit sequence.

On each of the panels 7, 9 and 11, and preferably at the top of each panel, is inscribed a different power of two. Preferably, from right to left in FIG. 1, the powers are $2^0$, $2^1$ and $2^2$.

Formed in the panel 7 is a recess 13 having square sides of length $u$ (FIG. 1) and a depth $p$ (FIG. 2). The recess 13 is adapted to receive a single unit counter 15 having square sides of length approximately $u$ and sufficiently less than $u$ to fit into the recess 13 without difficulty.

The counters 15 preferably have a thickness $d$ somewhat greater than $p$ to permit any of the counters to be readily inserted in and removed from the recess 13. A number of counters 15 is provided equal to the highest number that can be represented on the board 1, as will appear. The counters may be made of the same material as the board, although if the board is made of heavy cardboard, the counters are preferably of a more durable material, such as wood or plastic.

The panel 9 is provided with a single recess 17 adapted to receive two of the counters 15. The dimensions may be as indicated with a depth $p$. The recess 17 may be either vertically or horizontally oriented; in either case, it is preferred that it be formed as a single recess, as there is only one counting symbol in the binary system. (Zero is considered as a marking sign, not a counting sign.)

The panel 11 is formed with a single recess 19, of depth $p$. The lateral dimensions of the recess 19 are preferably $2u$ by $2u$, to receive four of the counters 15.

It will be apparent that if seven unit counters 15 are provided, the decimal number 7 can be represented as the binary number 111 by filling the recesses 19, 17 and 13 with four, two and one of the seven counters 15, respectively. Any smaller 3-digit binary number can be represented by taking that number of counters available and playing a game defined by the following rules:

(1) Try to fill the recess 19 with the given counters. If it is filled, with no counters left over, the binary number is 100, or decimal 4. If any counters are left over, proceed to step (2), and use the excess counters. In that case, the number is greater than 100. If there are not enough counters to fill the recess 19, the number is less than 100. If so, proceed to step (2) using all of the original counters.

(2) Taking the counters available from step (1), try to fill the recess 17. If one is left over, the second and third digits are 11; place the excess counter in the recess 13. If there are two counters, place both in the recess 17; the last two digits are 10. If there is only one counter, place it in recess 13; the last two digits are 01.

The general rule for playing the game with any number of digits will be evident from the example given. The game proceeds one panel at a time from left to right on the board. At each panel, the counters left over from the preceding panel are used in an attempt to fill the recess in the panel. If there are just enough, the game is over. If there are too many, the excess counters are taken to the next panel. If there are too few, all of the counters are taken to the next panel. The value of a number so expressed is equal to the numbers used, a concept readily grasped. To name the number, the student is told that the name of each filled square is "one," and the name of each unfilled square is "zero." The weights of each digit position are evident from the number of counters they contain. It will be apparent to those skilled in the art that these rules are sufficiently simple that they can readily be taught to children.

FIGURE 3 shows a number board 1a arranged to illustrate the trinary number system. As in the embodiment shown in FIG. 1, provision is made for expressing a three digit number by playing the game of filling recesses in three panels 21, 23 and 25 from left to right. Two recesses are provided in each panel, as there are two counting signs, 1 and 2, in the binary system.

As indicated, the panels are inscribed at the top with powers of three ascending from right to left and representing the weights $3^0$, $3^1$ and $3^2$ of the ascending trinary digits. The panel 25, representing the lowest ordered digit, is provided with two unit recesses 27 and 29 labelled 1 and 2, respectively. Each of these recesses is adapted to receive one of the counters 15.

The student will bring to panel 25 none, one or two counters. If there are none, the digit is 0. If there is 1, it is placed in the lowest recess 27 and the digit is read, as labelled, "1." If there are two counters, both recesses are filled and the digit is trinary 2, the label of the highest numbered filled recess.

The second panel is provided with two 3-unit recesses 31 and 33, labelled "1" and "2," respectively. Each of these recesses is adapted to receive three counters 15. The procedure in filling the recesss is essentially the same as the process of filling the successive panels. The student begins with the lowest numbered recess on the panel, and tries to fill it with the available counters. If there are not enough, he takes all of the counters to the next panel to the right. If there are too many, the excess counters are taken to the next higher numbered recess, 33 on the panel 23, and carries out the same procedure.

The panel 21 is provided with two 9-unit recesses 35 and 37, labelled "1" and "2," respectively. Each of these recesses is adapted to receive nine unit counters 15.

Twenty-six counters 15 should be provided for use with the board 1a, whereby the trinary numbers from 000 to 222 can be expressed. For example, trinary 121, or decimal 16, would be expressed with 16 counters by placing 9 of the counters in the recess 35, noting that the seven remaining would not fill the recess 37, successively filling the recesses 31 and 33, and placing the remaining counter in the recess 27.

FIGURE 4 shows a number board 1b adapted to illustrate the quaternary number system. In this system, there are three counting signs 1, 2 and 3. Accordingly, each of three panels 39, 41 and 43 is provided with three correspondingly labelled recesses, preferably labelled with the lowest numbered counting sign at the bottom as shown.

The capacities of the recesses in the panels 39, 41 and 43 are successively greater in an ascending quaternary sequence. Thus, the recesses, such as 45 in the panel 39 are each adapted to receive one unit counter, the recesses such as 47 in the panel 41 are each adapted to receive four unit counters, and the recesses such as 49 in the panel 43 are each adapted to receive sixteen unit counters. For use with the board 1b, 63 unit counters should be provided, to permit the quaternary numbers from 000 to 333 to be expressed.

In general, a number board in accordance with my invention is made with $n$ labelled panels, where $n$ is the largest number of digits to be expressed. Preferably, each panel is labelled in an ascending sequence of powers of the base $b$ of the number system, from right to left, $b^0, b^1, b^2 \ldots b^{(n-1)}$. Each panel is provided with a number of spaces, preferably labelled, for receiving unit counters equal to the number of counting signs $(b-1)$ in the number system. Each labelled space on a panel labelled $b^i$, where $i$ is the power of the base, is adapted to receive $b^i$ unit counters. A number of unit counters is provided that is preferably equal to $$(b-1)(b^0+b^1+ \ldots +b^{(n-1)})$$

so that any number $$N=\sum_{i=0}^{n-1}a_i b^i$$

where the $a_i$ are members of the set $(0, 1, 2 \ldots (b-1)$, can be expressed.

Various modifications of the specific embodiments of my invention described above are within the scope of my invention in its broader aspects. For example, it is not essential that the unit counters be rectangular in shape; they could be made as round pegs fitting mating holes in the board. The mating holes would be grouped in sets of $b^i$ holes, e.g., the digit $2\times 3^2$ in the trinary number 200 would be associated with 2 sets of 9 grouped holes to receive 9 pegs each. As another example, the number board and unit counters could be made of or incude ferromagnetic material, the counters or the board could be magnetized, and the counting receptacles on the board could be inscribed with paint. Another variation, prticularly convenient with larger number bases, is the provision of fewer than $(b-1)$ counting spaces on the highest ordered panel. For example, a complete $10^2$ digit panel for the base 10 number system would require 9 counting spaces each large enough for 100 unit counters. If desired, only one such space could be provided, permitting a count from 0 to 199.

While I have described my invention with respect to the details of specific embodiments thereof, many possible changes and variations will occur to those skilled in the art upon reading my description, and such can obviously be made without departing from the scope of my invention.

Having thus described my invention, what I claim is:

1. Apparatus for teaching the expression of an $n$-digit number in a number system having a base $b$, comprising, in combination, a number board, a set of unit counters each having an area $k$, means dividing the board into at least two separate panels, a first panel at one edge of said board having exactly $b-1$ inscribed spaces, each space corresponding to a different one of the $b-1$ counting signs in said number system, and being adapted to receive one of said unit counters, and the panel adjacent said first panel having at least one inscribed space adapted to receive at least $b$ unit counters.

2. Apparatus for teaching the expression of an $n$-digit number in a number system having a base $b$, comprising, in combination, a number board having at least one face on which there are provided:
 (a) inscriptions visually dividing the board into a sequence of panels,
 (b) indicia on each panel comprising the labels $b^0$, $b^1 \ldots b^{(n-1)}$ in sequence, one on each of the sequential panels,
 (c) a set of $b-1$ inscribed spaces on each panel labelled $b^0, b^1 \ldots b^{(n-2)}$, each space having an area equal to $kb^i$ where $i$ is the exponent on the label of the panel on which the space is located and $k$ is a constant, at least one inscribed space having an area equal to $kb^{u-1}$ on the panel labelled $b^{(n-1)}$, and a set of unit counters, each having an area $k$ and adapted to fill one labelled space on the panel labelled $b^0$.

3. The apparatus of claim 2, in which each inscribed space on a panel is labelled with a different one of the $(b-1)$ counting signs in the number system.

4. A number board for use in teaching the expression of an $n$-digit number in a number system having a base $b$, said number board comprising a rectangular sheet of material, $n-1$ equally spaced parallel grooves formed on said board normal to one edge of the board and extending thereacross to the opposite edge, said grooves being spaced and located to divide the board visually into $n$ panels of the same shape and of equal areas, said panels each being inscribed with a successive one of the sequence of symbols $b^0, b^1 \ldots b^{n-1}$ in an ordered sequence from one side of the board to the other, each of said panels having formed therein a set of $b-1$ rectangular recesses of the same depth and having shapes in planes parallel to the board formable from a set of unit $k\times k$ squares, where $k$ is a constant, the area of each recess on each panel being $kb^i$ where $i$ is the exponent of the label on the panel, and a counting label inscribed on each panel adjacent each recess, said counting labels for each panel comprising a complete set of the $b-1$ counting signs in the number system.

5. The apparatus of claim 2, in which the number of unit counters is equal to $$(b-1)\sum_{i=0}^{(n-1)}b^i$$

6. The apparatus of claim 5, in which said inscribed spaces comprise recesses formed in said number board, each recess being of the same depth and having a shape in planes parallel to the board formable from a set of unit $k\times k$ squares and in which said unit counters comprise generally rectangular blocks having two parallel square sides approximately of length $k$ and adapted to fit into said recesses.

References Cited
UNITED STATES PATENTS

| | | | |
|---|---|---|---|
| 532,282 | 1/1895 | Myers | 35—33 |
| 3,138,879 | 6/1964 | Flewelling | 35—32 |
| 3,235,975 | 2/1966 | Pierson | 35—30 |

LAWRENCE CHARLES, Primary Examiner